Figure 1:
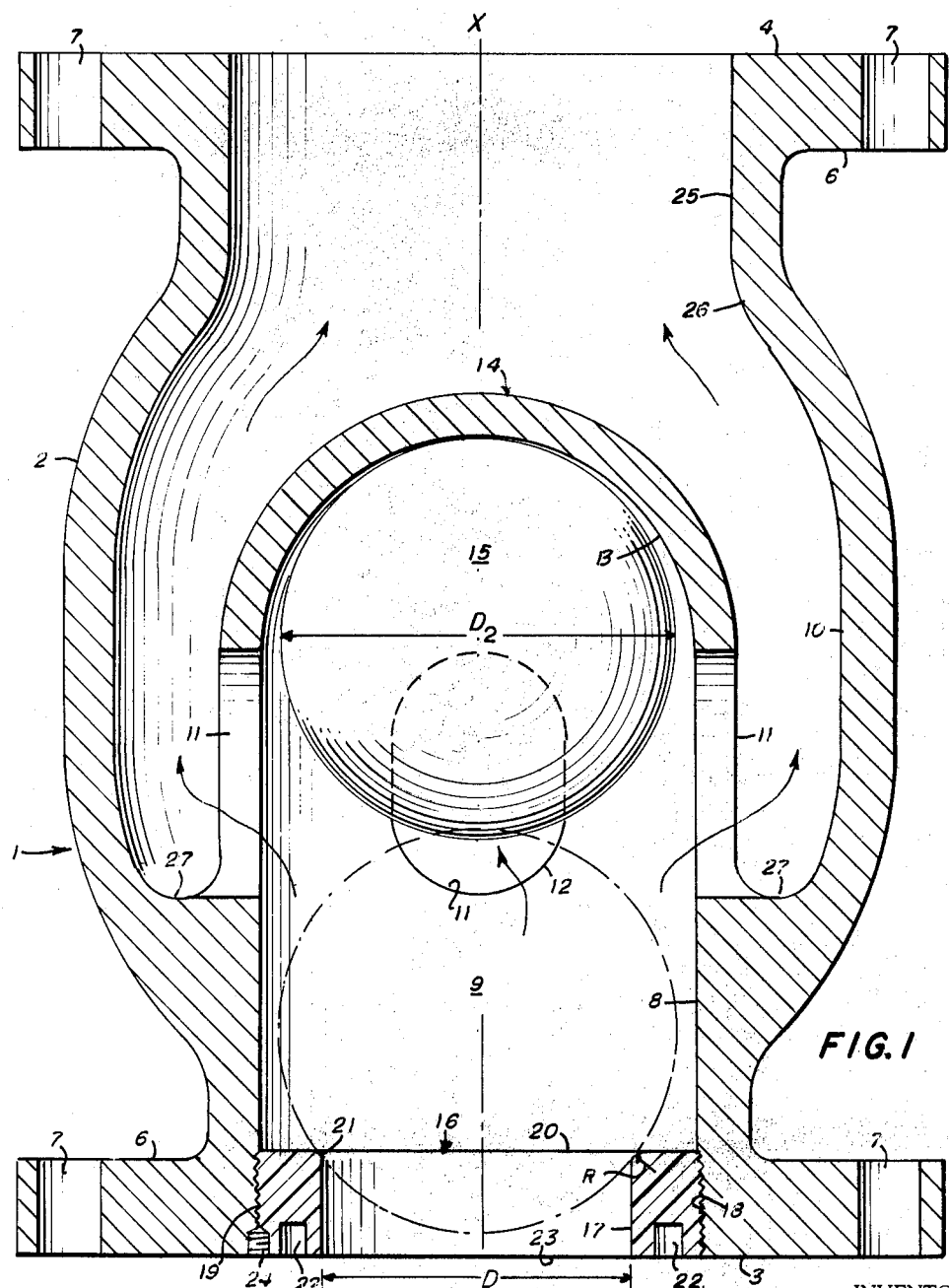

July 12, 1966  H. J. LIEBMANN  3,260,279

FLUID FLOW CONTROL VALVE

Filed Jan. 25, 1963

INVENTOR
HENRY J. LIEBMANN
BY Oscar L. Spencer
ATTORNEY 3,260,279
FLUID FLOW CONTROL VALVE
Henry J. Liebmann, Barberton, Ohio, assignor to Pittsburgh Plate Glass Company, Pittsburgh, Pa., a corporation of Pennsylvania
Filed Jan. 25, 1963, Ser. No. 253,929
1 Claim. (Cl. 137—533.15)

The present invention relates to an improvement in one-way ball type check valves intended to control the flow of fluids under pressure, more particularly the flow of chlorine gas under pressure.

Ball type check valves such as the type herein described have basically two purposes in the control of the flow of fluids in any given fluid system. The first being the control of fluid entering; such control is caused by the co-operation of the particular ball utilized and the valve seat acting to seal off the inlet for entering fluids until the pressure thereof is sufficient to lift the ball from the valve seat. The second purpose generally is to prevent the back flow of fluids which have perviously been pumped past the valve.

During the valving operation there occurs the normal up and down movement of the ball within the valve, however, if there is any turbulence present in the fluids in the valve there also occurs a bouncing or irregular movement of the ball. Added to the normal wear of the parts of the valve there is the additional and irregular wear that occurs due to the bouncing of the ball created by the turbulence.

The ball-type check valve herein described is primarily adapted to be used in a system for pumping chlorine gas having sulfuric acid droplets contained therein. Such a fluid is highly corrosive in nature and causes unusually rapid wear of metal, but more particularly non-metal, valve elements.

An object of the invention therefore, is to provide a one-way ball-type check valve of improved construction and design which eliminates the turbulence present in previous valves.

Another object of the invention is to provide a valve seat of improved construction and design which will be highly resistant to corrosion, wear, and deterioration.

Still another object of the invention is to provide a one-way-type check valve which is equipped with a readily removable valve seat.

The objects of the invention are achieved by a ball-type check valve having a hollow body member with a cage therein and a spherical ball received within the cage, the ball additionally being retained within the cage by a valve seat, the body member and the cage being so constructed to eliminate turbulence in the fluid flowing therethrough, and the valve seat constructed so that the region of contact between the spherical ball and the valve seat is of rounded configuration.

Other objects, features and advantages of the invention will be apparent from the following detailed description.

Figure 2:
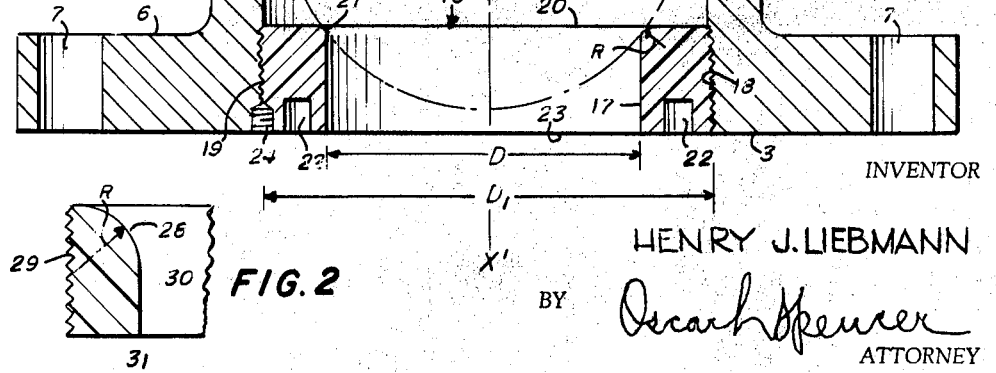

In the drawings:

FIG. 1 is a detailed cross-sectional view of the valve housing and the ball valve; and FIG. 2 is a fragmentary cross-sectional view of an enlarged scale of a modified form of valve seat from that shown in FIG. 1.

Referring to the drawings, the valve housing is shown in a detailed cross-sectional view in FIG. 1 and is generally designated 1. The valve housing 1 is generally hollow and of elongated spherical or shell-like configuration. Intermediate extending wall portion 2 forms the body of the valve housing 1 and is generally of elongated spherical configuration. The intermediate wall portion 2 is joined with an inlet end 3 and an outlet end 4 in a streamlined manner.

The inlet end 3 and the outlet end 4 are oppositely disposed and form about the ends of the valve housing 1 and lie about a longitudinal axis X–X'. The inlet end and the outlet end may be in the form of circular flanges as at 6 for mounting the valve in a fluid system. The flange members 6 may have holes 7 spaced about the periphery for bolting the valve to connecting pipes. The flange mounting means are not critical to the objects of the invention and any suitable mounting means may be provided.

Joined with the inlet end 3 is an inwardly extending and generally cylindrical wall 8 lying about axis X–X'. The portion of wall 8 nearest the inlet end 3 is coextensive with a portion of the intermediate extending wall 2. Wall portion 9 is a continuation of the wall 8 and extends further into the valve housing. Wall 9 is cylindrical and is in spaced parallel relation to the internal surface 10 of the intermediate extending wall 2. The internal surface 10 is concentric to wall 9 and lies about axis X–X'.

Cylindrical wall portion 9 has a plurality of spaced apart apertures 11 therein such as the four shown in FIG. 1, spaced approximately 90 degrees apart. The apertures 11 are elongated in shape and have their ends semi-circular as at 12. The configuration and the positioning of the apertures 11 is not critical. However, the size of the opening defined by each aperture 11 must not be so small that in effect a nozzle is formed. Free flow of the fluid through the valve is intended and it is not desirable to create a build up of pressure on the inlet side of the apertures 11.

Wall portion 9 at its inner end converges in a hemispherical shaped end 13. The wall portion 9, the apertures 11 therein and the hemispherical shaped end 13 form a cage, generally designated 14, in line with the wall 8 and the inlet end 3 of the valve housing 1.

Received within the wall 8 and the cage 14 is a hollow spherical metal ball 15. The ball 15 is free to move up and down and is constructed of 16 gage stainless steel or other suitable material. The diameter $D_2$ of the ball 15 bears a relationship to the internal diameter D of a removable valve seat 16 in the inlet end 3.

It was found on the evolution of this valve that the following particular combination of dimensions and hereinafter discussed gave the most effective results.

R _____ ¼"
D _____ 3¾"
$D_1$ _____ 5¼"
$D_2$ _____ 4¾"

The ratio of the above ball diameter $D_2$ of 4¾" to the cage diameter $D_1$ of 5¼" is approximately 0.9.

The removable valve seat 16 retains the ball 15 within the valve housing. The removable valve seat 16 is constructed preferably of a polytetraflouroethylene compound such as Teflon, having a substantial stiffness and hardness and being relatively restrictive to corrosion by chemical fluids in particular chlorine gas with droplets of sulphuric acid entrained therein, flowing through the valve. A valve seat formed of a compound of polytetraflouroethylene having approximately 15% glass fibers therein has proven to be optimum and results in a substantial increase in the wear-resistant properties already present in other polytetraflouroethylene valve seats.

The valve seat 16 is annular and has an external diameter $D_1$, an internal diameter D, a vertical inner face 17, and a vertical threaded outer face 18. The valve seat is positioned at the inlet end 3 of the valve housing 1 and is received and retained by an internal threaded portion 19 in the inwardly extending wall 8. An annular top face 20 connects with the inner face 17 by an outward and radial portion 21 having a radius R. As the radial portion 21 forms the contact region between the valve seat 16 and the metal ball 15. The radius R of ¼" for the valve seat having an internal diameter of 3¾" has been found to provide a very satisfactory fluid seal for the ball 15 having a diameter of 4¾". The metal ball 15 is shown in fluid sealing relation with the valve seat 16 by the broken-line showing thereof in FIG. 1.

As the dimensions of the valve seat 16 and the metal ball member 15 are varied to accommodate a particular fluid system, the valve seat may be modified as shown in FIG. 2. The rounded portion 28 of radius R may extend to connect the outer face 29 with the inner face 30. The bottom face 31 is similar to the bottom face 23 of valve seat 16.

Adequate fluid sealing relation is possible by the described radial contact region 21. Additionally, when normal wear occurs, the outwardly radial portion 21 becomes flattened and eventually assumes a concave configuration (not shown) due to the curvature of the metal ball 15. As the normal wear occurs the fluid seal between the ball 15 and the valve seat 16 is retained, and consequently the life of the valve seat is increased by the period of time required to wear the rounded portion 21 of the valve seat down from a radial to a concave configuration.

The valve seat 16 has a plurality of spaced apart indentations 22 in the bottom face 23 which allow the valve seat to be gripped for removal and replacement. The indentations are generally spaced approximately 180 degrees apart to enable removal by a standard fork-type wrench.

Disposed half-way between the valve seat 16 and the adjacent wall portions 19 of the valve housing 1, are one or more drilled out and tapped holes to receive set-screws 24 to retain the valve seat in the proper position within the valve housing and prevent rotation thereof.

Joined with the outlet end 4 is an inwardly extending wall portion 25. Wall portion 25 is generally cylindrical and connects with the intermediate extending wall 2 in a streamlined manner as at 26. The internal surface 10 of the intermediate wall 2 joins with the cylindrical wall 9 also in a streamlined arcuate manner as at 27.

In the operation of the valve, fluid under pressure enters the valve housing at the inlet end 3 from a pipe not shown having a diameter generally equal to $D_1$, and flows through the valve seat 16 having a diameter D which is smaller than diameter $D_1$. The increase in velocity of the fluid has the effect of holding the metal ball 15 in suspension with a minimum amount of bouncing. The ball 15 is maintained in suspension and generally in contact with the hemispherical portion 13 of the cage 14 by the flow of fluid through the valve. The ball 15 nearly fills the hemispherical closed portion 13 and is held therein by greater forces acting on its lower exposed portion than on its upper more confined portion.

The streamlined configuration of the valve housing, in particular the area surrounding the cage 14 formed by the parallel relation of the wall 9 and the internal surface 10 of the intermediate extending wall 2, has the effect of causing a reduction in turbulence and a substantially laminar flow of fluid.

When the pressure is withdrawn from the entering fluid, the metal ball 15 falls and seats in the valve seat 16 in fluid sealing relation and thereby closes off back flow of fluid from the outlet end 4 to the inlet end 3.

The invention has been described by a detailed description of specific embodiments, however, various modifications may be made thereof by those skilled in the art without departing from the scope of the invention as set forth in the appended claim.

What is claimed is:

A ball check valve for controlling the flow of fluid comprsing a generally hollow valve housing of streamlined configuration, said valve housing having an inlet portion and an outlet portion oppositely disposed and lying about a longitudinal axis through said valve housing, a removable valve seat mounted in the inlet portion a cage extending into said valve housing from the inlet portion, a spherical ball member received within said cage and having a diameter to cage diameter ratio of approximately 0.9, said cage terminating remote from said inlet portion in a hemispherical closed portion and having a plurality of apertures therein adjacent said hemispherical closed portion, thereby permitting uninterrupted fluid flow through the valve when the ball is in contacting relation with the cage, said ball nearly filling the hemispherical closed portion and held therein by a greater amount of forces acting on its more exposed portion than on its confined portion, and preventing the back flow of fluid when the ball and the valve seat are in fluid sealing relation, said valve seat being annular and constructed of a synthetic material having a substantial stiffness and hardness, said material having at least 15% glass fibers therein, said valve seat having a vertical inner face at its internal diameter, a vertical outer face at its external diameter, said outer face and said inner face having a top and a bottom, an annular top surface extending outwardly and radially and connecting the vertical inner face and the vertical outer face at the tops thereof, an annular bottom face connecting the vertical inner face and the vertical outer face at the bottoms thereof, said bottom face having a plurality of spaced indentations therein.

References Cited by the Examiner

UNITED STATES PATENTS

| 1,244,689 | 10/1917 | Bell | 137—533.11 X |
|-----------|---------|------|--------------|
| 1,279,599 | 9/1918 | Slaughter | 137—533.15 X |
| 1,542,612 | 6/1925 | Collar | 251—360 X |
| 1,779,322 | 10/1930 | Leidecker | 137—533.13 |
| 2,348,323 | 5/1944 | Binder | 137—533.11 X |
| 2,591,951 | 4/1952 | Lowry | 137—533.13 X |
| 2,824,060 | 2/1958 | White | 252—12.2 |
| 2,899,974 | 8/1959 | Gratzmuller | 137—533.11 |
| 3,134,394 | 5/1964 | Ohta | 137—220 |

OTHER REFERENCES

Hughes and Sanfford, Hydraulics, N.Y., Macmillan, 1926, p. 62.

ISADOR WEIL, *Primary Examiner.*

MARTIN P. SCHWADRON, *Examiner.*

D. LAMBERT, *Assistant Examiner.*